UNITED STATES PATENT OFFICE.

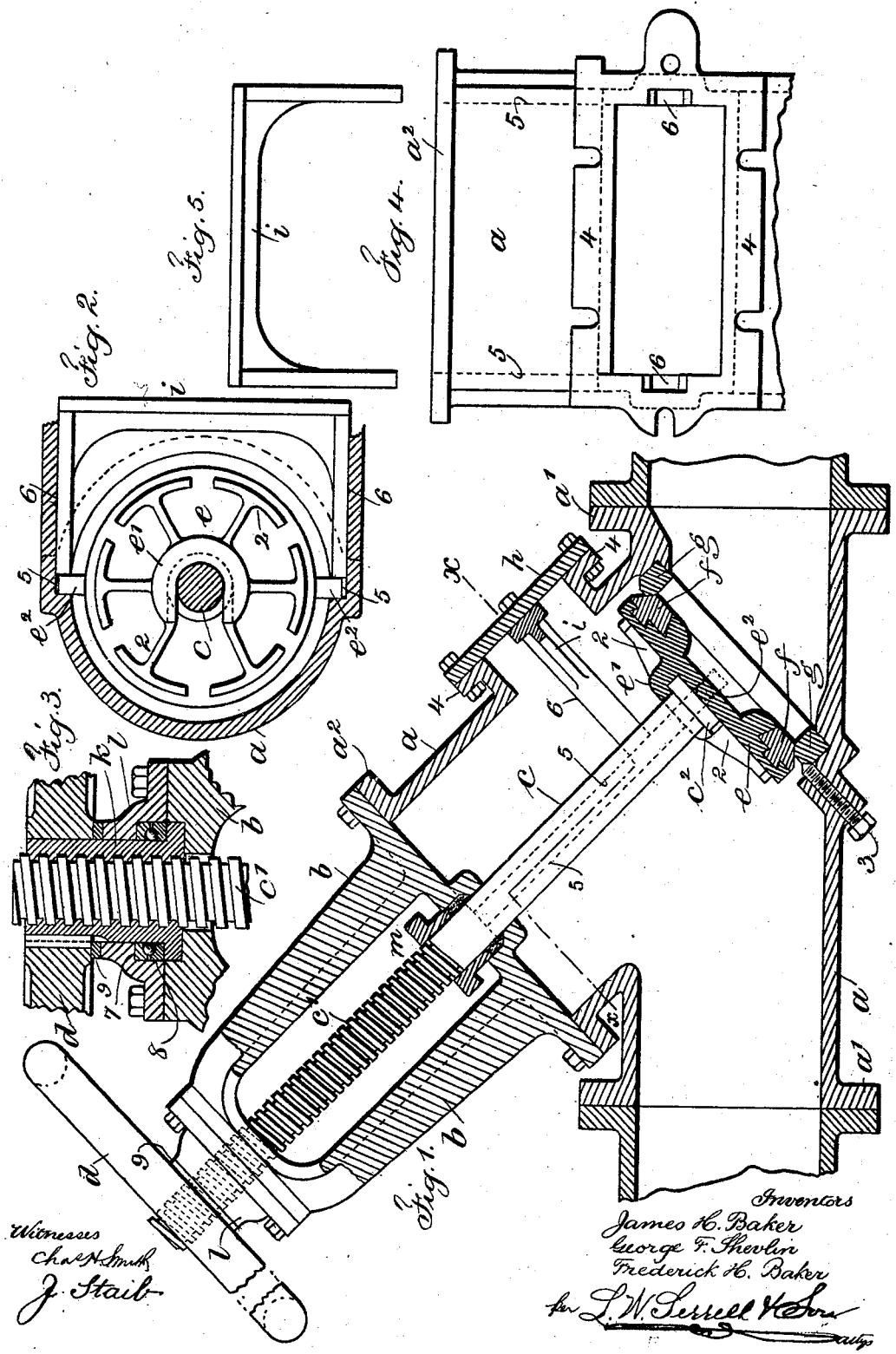

JAMES H. BAKER, GEORGE F. SHEVLIN, AND FREDERICK H. BAKER, OF SARATOGA SPRINGS, NEW YORK.

VALVE FOR WOOD-PULP DIGESTERS, &c.

SPECIFICATION forming part of Letters Patent No. 682,838, dated September 17, 1901.

Application filed January 16, 1901. Serial No. 43,511. (No model.)

*To all whom it may concern:*

Be it known that we, JAMES H. BAKER, GEORGE F. SHEVLIN, and FREDERICK H. BAKER, citizens of the United States, residing at Saratoga Springs, in the county of Saratoga and State of New York, have invented an Improvement in Valves for Wood-Pulp Digesters and Similar Devices, of which the following is a specification.

Our invention relates to valves adapted for use in mills for preparing wood-pulp for paper-making and in mills where acid is used in the operations of the digester to obviate the difficulties heretofore experienced and the expense heretofore incurred in the removal or renewal of such valves and their parts, because heretofore it has been necessary to take the valve-body out of its position in the line of piping in order to renew the valve or to get at the parts for the purpose of repair. Our invention is designed to obviate these difficulties and to increase the facility of working the valve, as well as obtaining access to the parts thereof.

We employ a valve having a body in the line of piping and which body is usually inclined and preferably includes a cylindrical portion receiving the valve and valve-stem and to which a removable bonnet is secured. We provide a removable valve-seat and removable valve, a side opening in the body of the valve and a cover for the opening, devices in the valve-body insuring the longitudinal movement of the valve and which prevent the turning of the same, means providing for the removal of the valve through the opening in the side of the body, and devices acting in connection with this opening to prevent the valve becoming disengaged from the devices providing for its longitudinal movement. We also provide a non-rising hand-wheel for actuating the valve-stem and a ball-bearing device upon which the said non-rising hand-wheel turns, all of which devices are hereinafter more particularly set forth.

In the drawings, Figure 1 is a vertical section and partial elevation representing our improvement. Fig. 2 is a sectional plan at $xx$ of Fig. 1 looking endwise upon the parts. Fig. 3 is a vertical section, in larger size, of the bearing for the non-rising hand-wheel. Fig. 4 is a plan of the side of the valve-body with the cover of the side opening removed; and Fig. 5 is a side elevation of a spanner-key adapted to be passed through the side opening in the valve-body and into opposite grooves, as hereinafter described.

The valve-body $a$ is provided with flanges $a'$ to connect the same in a line of piping from the digester or other structure, and this valve-body includes the cylindrical inclined portion having a flange $a^2$. The bonnet $b$ rests upon and is securely connected by bolts to the flange $a^3$, and the said bonnet is provided with an opening for the threaded portion $c'$ of the valve-stem $c$, and the outer end of the said bonnet is provided with a flat surface and with an annular recess surrounding the threaded portion $c'$ of the valve-stem.

$d$ represents the non-rising hand-wheel, to which the nut $k$, surrounding the threaded portion $c'$ of the valve-stem, is securely connected by a key or in any other manner known in the art. The nut $k$ is provided with a flanged base received in the annular recess in the outer end of the bonnet. A cap $l$ rests upon the flat end of the bonnet $b$, surrounds the nut $k$, and is secured to the bonnet by bolts, (shown especially in Figs. 1 and 3,) and we prefer to employ a washer 9 between the face of the cap $l$ and the under face of the hand-wheel $d$, and the base of the cap is provided with an annular recess around the nut $k$, receiving the ball-races 7 and 8 and an intervening row of balls, the said ball-races agreeing substantially in width with the flange at the base of the nut $k$, the hand-wheel $d$ and nut $k$ turning together and the ball-race 8 revolving with the nut and hand-wheel, the friction being compensated for by the intervening row of balls. It is obvious with this construction that we may employ any convenient device for securely connecting or tying together the hand-wheel $d$ and the nut $k$ and adjusting the relation of the parts one to the other so as to take up any wear that may arise in the ball-races or the intervening row of balls or other parts. From this construction it will be apparent not only that the hand-wheel maintains its relation to the bonnet and does not rise, but that very little effort is required to operate the hand-wheel and longitudinally move the valve-stem $c$. Upon the lower end of the valve-stem $c$ we provide a head $c^2$.

The valve proper comprises a valve-disk $e$, having on one face a collar $e'$ and radial and curved ribs 2 and projecting from opposite edges guide-pins $e^2$, the valve-face $f$, preferably of acid-proof material, being connected to the disk $e$ by dovetailed interlocking faces or in any other manner well known in the art, the periphery of the face $f$ being tapering to fit the removable valve-seat $g$. This valve-seat in the form of a ring fits into an annular recess having faces at right angles to one another formed in the valve-body, and we employ one or more tap-bolts 3, passing through the valve-body and having bevel or tapering points to rest upon the tapering edges of the removable valve-seat, the said tap-bolts acting not only to hold the valve-seat in the valve-body, but to force the same to its seat and form a tight joint. The collar $e'$ on the valve-disk is undercut to receive the head $c^2$, there being a side opening in the collar through which the said head is passed to its seat in the collar and from which the said head may also be removed at pleasure. We provide in the inner opposite faces of the valve-body longitudinal grooves 5, receiving the guide-pins $e^2$, and through which grooves the guide-pins move as the valve is lifted from or moved toward its seat. The valve-body is provided with a side opening, having flanges 4 surrounding the opening and a removable cover $h$ secured to the flanges by bolts to close the said opening. As will appear from Fig. 4, the said opening and flanges are of rectangular form, and we provide transverse grooves 6 in the opposite faces of the opening, which grooves extend down to and open into the longitudinal grooves 5.

A spanner-key $i$, having a T-shaped cross-bar and two limbs, is employed, the cross-bar bridging the opening in the side of the body and the limbs extending down in the transverse grooves 6. The outer ends of the grooves 6 are provided with offsets or, in other words, are broadened to receive the T-shaped cross-bar and form a seat for the same, in which the outer surface of the cross-bar is approximately flush with the face of the flanges 4, and when thus to its seat the free ends of the limbs come to the lower ends of the grooves 6 and form continuations of the body of the valve at the longitudinal grooves 5.

With this construction the valve and the valve-seat are accessible and may be removed or repaired without taking the valve-body out of its position in the line of piping. This is accomplished by removing the bolts securing the cover $h$ to the flanges 4. The cover $h$ may be entirely removed or may be swung around out of the way on one of the bolts, thus leaving the opening in the valve-body clear. The spanner-key is then drawn out, leaving the transverse grooves 6 free and unoccupied. If the hand-wheel $d$ is now turned to draw the valve-stem longitudinally and raise the valve off its seat until the guide-pins $e^2$ come in line with the grooves 6, the valve may be drawn directly out of the body, the guide-pins moving along the grooves 6 and the collar $e'$ readily separating from the head $c^2$. Thereafter by loosening the tap-bolts 3 the valve-seat $g$ may be lifted from its position and removed through the same opening in the side of the valve-body. These parts may be as readily replaced or new and duplicate parts put in place in the reverse order and the cover closed down again, the valve-body meanwhile not having been disturbed in the line of piping.

We provide, as usual, through the center of the bonnet a packing-gland $m$ for the valve-stem. This may be of any usual or well-known construction and forms no necessary part of our present invention.

We claim as our invention—

1. The combination with a valve-body in the line of piping, a valve and valve-seat and a threaded valve-stem, of a bonnet secured to the valve-body, a cap secured to the bonnet, a nut received within the cap and bonnet around the threaded valve-stem, and a hand-wheel secured to the nut and an antifriction-bearing between said nut and said cap, substantially as set forth.

2. The combination with a valve-body in the line of piping, a valve and valve-seat and a threaded valve-stem, of a bonnet secured to the valve-body and having an annular recess in the outer face, a cap secured to the end of the bonnet and having an annular recess in the inner portion, a hand-wheel, a nut secured to the same and surrounding the threaded valve-stem with an annular flange received in the recess in the bonnet, the nut passing through the cap, and ball-races in the recess in the cap above the flange of the nut forming an antifriction-bearing for the parts, substantially as set forth.

3. The combination with the valve-body in the line of piping, a bonnet secured to the valve-body, a threaded valve-stem passing through the bonnet and a hand-wheel for operating the same, and a head on the opposite end of the valve-stem, of a removable valve-seat, the valve-body having an opening in the side and a removable cover for closing the same, means providing for the longitudinal movement of the valve through the valve-body whereby the turning of the same is prevented, means providing for the removal of the valve-disk through the side opening, and means for preventing false movements of the valve-disk along the valve-body, substantially as set forth.

4. The combination with the valve-body in a line of piping having an inclined portion, a side opening a cover extending over the opening, longitudinal grooves in opposite inner faces of the body and transverse grooves in opposite inner faces of the body at the opening, which transverse grooves open into or connect with the longitudinal grooves, of a bonnet connected to the inclined portion of the body, a threaded valve-stem passing through the bonnet and a hand-wheel for operating the same, a head on the inner end of the valve-stem, a valve-disk having an open undercut collar receiving the head of the valve-stem and from which the valve-disk is removable, guide-pins upon opposite sides of the valve-disk in the longitudinal grooves of the valve-body and movable through the transverse grooves of the valve-body at the opening, and a device inserted through the opening in the valve-body and occupying the transverse grooves and serving as a key to prevent false movements of the valve-disk and its guide-pin, substantially as set forth.

5. The combination with the valve-body in a line of piping, having an inclined portion, a side opening, a cover extending over the opening, longitudinal grooves in opposite inner faces of the body and transverse grooves in opposite inner faces of the body at the opening, which transverse grooves open into or connect with the longitudinal grooves, of a bonnet connected to the inclined portion of the body, a threaded valve-stem passing through the bonnet and a hand-wheel for operating the same, a head on the inner end of the valve-stem, a valve-disk having an open undercut collar receiving the head of the valve-stem and from which the valve-disk is removable, guide-pins upon opposite sides of the valve-disk in the longitudinal grooves of the valve-body and movable through the transverse grooves of the valve-body at the opening, a spanner-key bridging the side opening in the valve-body and having parts received in the transverse grooves, means for holding the spanner-key in place so that the free ends of the parts in the transverse grooves form continuations of the valve-body along the edge of the longitudinal grooves, substantially as set forth.

6. The combination with the valve-body in a line of piping having an inclined portion, a side opening, a cover extending over the opening, longitudinal grooves in opposite inner faces of the body and transverse grooves in opposite inner faces of the body at the opening, which transverse grooves open into or connect with the longitudinal grooves, of a bonnet connected to the inclined portion of the body, a threaded valve-stem passing through the bonnet and a hand-wheel for operating the same, a head on the inner end of the valve-stem, a valve-disk having an open undercut collar receiving the head of the valve-stem and from which the valve-disk is removable, guide-pins upon opposite sides of the valve-disk in the longitudinal grooves of the valve-body and movable through the transverse grooves of the valve-body at the opening, and a spanner-key comprising a T-shaped cross-bar and two limbs, the cross-bar bridging the opening in the side of the valve-body, and the limbs filling the transverse grooves, the outer ends of the transverse grooves being offset to receive the T-shaped cross-bar and form a seat therefor below the removable cover to said opening and the free ends of the limbs coming to the longitudinal grooves and forming continuations of the valve-body along the edge of said groove to retain the guide-pins of the valve-disk in the longitudinal grooves, substantially as set forth.

7. The combination with the valve-body in a line of piping having an inclined portion and a side opening in the valve-body and a cover extending across the opening, a bonnet connected to the inclined valve-body, a threaded valve-stem passing through the bonnet and a hand-wheel for operating the same, of a valve-disk within the body and means for removably connecting the valve-disk to the valve-stem, means for guiding the valve-disk in its longitudinal movement through the valve-body and for removing the valve-disk through the side opening, means for preventing false movements of the valve-disk, a removable valve-seat fitting into an annular recess in the valve-body having faces at right angles to one another and bolts passing through the valve-body and bearing upon the removable valve-seat to hold the same in the valve-body and to force the same into intimate contact with the surface thereof, substantially as set forth.

Signed by us this 9th day of January, 1901.

JAMES H. BAKER.
GEO. F. SHEVLIN.
FRED. H. BAKER.

Witnesses:
WILLIAM J. DELANEY,
JOSEPH P. BRENNAN.